3,016,302
Patented Jan. 9, 1962

3,016,302
INSTANT CHIFFON PIE FILLING AND METHOD OF PRODUCING THE SAME
Austin R. Hunter, La Mesa, Calif., assignor to Kelco Company, San Diego, Calif., a corporation of Delaware
No Drawing. Filed Dec. 30, 1958, Ser. No. 783,667
24 Claims. (Cl. 99—131)

This invention relates to chiffon pie fillings and, more particularly, to an alginate composition additive for making instant cold, fruit flavored or acid-type chiffon pie fillings.

In the past, chiffon pie fillings have been made from gelatin mixtures. Gelatin in such a mixture requires the use of hot water or hot milk to dissolve the mixture before it can be whipped. Thus, after the mixture is so dissolved, it is whipped so as to create a flavored and colored foamed product that will retain its shape. The requirement that the gelatin be dissolved in hot liquids prevents such a mixture from being a true instant chiffon pie filling composition.

Previous attempts have been made to find a substitute for gelatin, but they have been unsuccessful. These prior art attempts did not produce a satisfactory foam and, further, the foam thus made did not retain its original shape for a long enough period, such as a few days.

In the prior art, so far as I am aware, no gelatinizing agent has been successfully used in cold water along with a whipping agent to form an instant acid-type chiffon pie filling. According to the present invention, a highly satisfactory and desirable chiffon pie filling may be prepared by adding a composition comprising a low calcium ash water-soluble alkali alginate, an edible acidic ingredient and a whipping agent to cold water.

In the present invention, I have developed a stable foamed product and a method of producing the same by utilizing a whipping agent to produce the foam and then stabilizing the foam by creating a gel system therein that maintains the foam structure at room temperature at which it may be made. The product can be utilized in any culinary dish requiring a light-bodied stable foam to which color and flavor can be added as desired. After the foamed filling has been formed, it need not be put under refrigeration, but it is generally desirable to do so in that this type of dessert is usually served chilled.

It has now been surprisingly found that the foregoing disadvantages of a hot type gelatin mixture can be overcome and a highly desirable instant chiffon pie filling composition can be prepared by mixing cold water with a combination of a low calcium ash water-soluble alginate, such as a sodium alginate containing not more than 1.0% of calcium oxide; an edible acidic ingredient, such as citric acid and a whipping agent, such as soybean protein.

My invention presents considerable advantages over what has been provided in the prior art. Firstly, cold water may be used instead of hot water. This makes a true instant chiffon pie filling possible, as it not only does not require the conventional heating of the water but, also, eliminates the need for removing the added heat thereafter. Thus, since the filling requires no cooling, after being whipped it sets and can be eaten in a matter of several minutes. Further, all the ingredients can be added to the water at the same time and, in addition, it is an all vegetable product.

It is therefore an object of the present invention to provide an acid-type instant cold chiffon pie filling and a method of making the product.

To make it possible to aerate or foam the mixture, including the water, by whipping and thus provide the chiffon effect, an edible whipping agent, such as egg albumen, sodium caseinate or soybean protein, alone or in combination, is employed. In practicing my invention, I have found that the preferred whipping agent is soybean protein, and desirable results have been obtained therewith when used at ½ to 1% by weight of the total weight of the finished filling.

In contrast to the prior art, my invention requires the use of only a low calcium ash alginate, an acidic ingredient and a whipping agent to make an instant chiffon pie filling when they are mixed with cold water. The requirement for only three ingredients is made possible by my surprising discovery that a low calcium ash sodium alginate containing not more than 1.0% of calcium oxide, in amounts depending upon its viscosity, produces the proper body to the foamed mixture. Further, the foam thus formed in a desirable creamy condition will not change markedly on storage. According to my invention, sodium alginate is preferred but low calcium ash potassium and ammonium alginates may also be used. If the calcium ash content is greater than 1.0%, other elements are required to make a good instant chiffon pie filling. The water-soluble alginates, such as low calcium ash sodium alginate, suitable for use in accordance with my invention may be prepared by any of the well-known methods such as disclosed in the following U.S. Patents: 1,814,981, Thornley and Walsh, July 14, 1931; 2,036,922, Clark and Green, April 7, 1936; 2,036,934, Green, April 7, 1936; 2,128,551, LeGloahec, August 30, 1938; but preferably by 2,477,861, Clark and Steiner, November 28, 1945.

The alginate is caused to gel by the action of an acidic ingredient, such as citric acid, upon the alginate to form an alginic acid gel. Unfortunately, a straight alginic acid gel has not proven satisfactory for this use since a suitable gel will not form in distilled water but will form in water of sufficient hardness such as is encountered in most of the municipal water supplies of the Southern California cities. However, this hardness can be supplied by including a small quantity of an edible calcium salt, such as calcium citrate, with the powdered mixture so as to enable it to produce an edible aerated product suitable for the intended use.

Although a satisfactory chiffon type product can be produced with a low calcium ash alginate, an acid and a whipping agent in normally hard cold tap water or with an added calcium salt in cold distilled or soft water, it is preferred that these advantages be modified by utilizing a calcium salt at a higher level along with a soluble sequestering agent to minimize the differences in hardness encountered in the water used. In a system such as this, the gelling mechanism is more than likely a combination acid-calcium alginate gel such that the alginate is caused to gel in the water by supplying calcium ions from a salt, such as dicalcium phosphate, which reacts with the alginate and forms calcium alginate. The source of the calcium may be from one of a number of edible calcium salts, such as dicalcium phosphate, calcium acetate, calcium benzoate, calcium citrate, calcium lactate, calcium carbonate, calcium tartrate, calcium gluconate and tricalcium phosphate.

It is desirable that the availability of calcium ions in solution be delayed until the alginate has completely dissolved, the latter occurring in a very few minutes. I delay the availability of the calcium ions by use of a buffering or a sequestering agent. In general terms, the sequestering agent may be any edible soluble salt or acid in which the calcium salt is substantially insoluble or undissociated in water and in which the cation does not precipitate the alginate. I have found sodium hexametaphosphate to be the preferred sequestering agent in the practice of the present invention, but others, such as trisodium phosphate, disodium phosphate, tetrasodium pyrophosphate, sodium tripolyphosphate, tripotassium phosphate, tetrapotassium pyrophosphate and potassium tripolyphosphate, may be used.

The edible acidic ingredient is employed to release the calcium ions from the insoluble calcium salt so that they are free to react with the alginate to form the gel. That is, the acid is used to solubilize the calcium salt so that it will be free to react with the water-soluble alginate after the latter is in solution. For this purpose, citric acid is preferred because it is inexpensive, readily obtainable and crystalline so as to be adapted for powdered, instant, packaged food uses. Other acidic ingredients, such as tartaric acid, fumaric acid, adipic acid or glucono-delta-lactone, may also be used. Their use, however, requires formulation changes of the filling mixtures so as to properly regulate the setting times. These changes are necessary because of the differences in solubility and differences in final pH of tartaric acid, fumaric acid, adipic acid and glucono-delta-lactone. Sufficient acid also needs to be present to impart acidic taste, such as is present in most fruit. This is especially desirable for the acid-type chiffon filling as fruit or imitation fruit flavoring is usually used as the flavoring ingredient.

When a low viscosity sodium alginate is used, a greater quantity thereof is necessary to produce the proper body and gel characteristics for good filling properties than is required for a high viscosity sodium alginate. For example, a low viscosity sodium alginate may require up to twice the amount of a high viscosity alginate with at least a corresponding increase in the amount of the calcium salt. Thus, it is preferable to use a high viscosity sodium alginate so as to use less in the mixture for economic reasons. By way of definition, a high viscosity sodium alginate as used in this invention is one which has a viscosity in the range of 400 centipoises for a 1% as is water solution, and a low viscosity sodium alginate is in the range of about 20 centipoises for the same percentage solution. It has also been found that it is preferable to use a fine mesh sodium alginate which passes through 100 mesh U.S. Standard screen in order to obtain complete solution in a short mixing time.

The following examples will serve to illustrate the formulations of satisfactory instant chiffon pie fillings. Each of the examples may be colored and flavored as desired.

*Example 1*

Acid chiffon pie filling without calcium salt or sequestering agent for use in tap water:

| | Grams |
|---|---|
| Sodium alginate (calcium oxide content not greater than 1.0%) | 2.5 |
| Whipping agent | 2.5 |
| Citric acid (granular) | 2.0 |
| Sugar | 40.0 |
| | 47.0 |

Usual mixing procedure: add above ingredients to one cup cold water and after whipping one minute add ⅓ cup of sugar, and continue whipping for about 2 to 5 minutes until peaks are formed.

*Example 2*

Acid chiffon pie filling without sequestering agent for use with distilled water:

| | Grams |
|---|---|
| Sodium alginate (calcium oxide content not greater than 1.0%) | 2.5 |
| Whipping agent | 2.5 |
| Citric acid (granular) | 1.5 |
| Sugar | 40.0 |
| Calcium citrate | 0.05 |
| | 46.55 |

Same mixing procedure as in Example 1, but use one cup of distilled or soft water. This formulation will also work in hard tap water but a much faster setting time is obtained (i.e., 10 minutes against a 30-minute set in distilled water).

Our preferred formulations, however, are made utilizing both a calcium salt and sequestering agent, such as in Example 3.

*Example 3*

A preferred package of dry ingredients:

| | Percent |
|---|---|
| Sodium alginate (calcium oxide content not greater than 1.0%) | 2.30 |
| Dicalcium phosphate | 0.30 |
| Sodium hexametaphosphate | 0.85 |
| Whipping agent | 2.30 |
| Citric acid (granular) | 1.40 |
| Sodium chloride | 0.30 |
| Sugar | 92.55 |
| | 100.00 |

*Example 4*

A preferred package of dry ingredients for forming a heavier bodied mix and more stable foam:

| | Percent |
|---|---|
| Sodium alginate (calcium oxide content not greater than 1.0%) | 2.30 |
| Dicalcium phosphate | 0.50 |
| Sodium hexametaphosphate | 0.85 |
| Whipping agent | 2.30 |
| Citric acid (granular) | 1.40 |
| Sodium chloride | 0.30 |
| Sugar | 92.35 |
| | 100.00 |

The amount of calcium can be varied to alter the properties of the solution, while it is being mixed, and of the final product. For example, by increasing the level of dicalcium phosphate from 0.30% as shown in Example 3 to 0.50% as shown in Example 4, a heavier bodied mix is obtained which forms a finer foam in a shorter mixing time, the foam being also more stable. That is, the filling sets sooner and has more body.

*Example 5*

A preferred chiffon pie filling:

| | Percent |
|---|---|
| Sodium alginate (calcium oxide content not greater than 1.0%) | 0.70 |
| Dicalcium phosphate | 0.09 |
| Sodium hexametaphosphate | 0.26 |
| Soybean whipping agent (Whitson's Whipping Agent No. 100) | 0.70 |
| Citric acid (granular) | 0.43 |
| Sodium chloride | 0.10 |
| Sugar | 28.00 |
| Water | 69.72 |
| | 100.00 |

In Example 5, all of the ingredients, including water, which have been found to be suitable for forming an excellent chiffon pie filling are listed. This specific mixture has been prepared by blending the dry ingredients thoroughly and adding four ounces of a powdered mix, as illustrated in Examples 3 and 4, to each cup of water used and then whipping at high speed until the desired whip is obtained and the filling holds in peaks. The whipping takes from 2 to 5 minutes depending upon the mixing equipment and the type of water used. The filling is then ready to be placed in a prepared baked pie shell and may be chilled by refrigeration. The pie is ready to eat in less than 30 minutes or when sufficiently chilled.

Sweetness is controlled by the amount of sugar used and can be altered to suit individual preferences; however, some added body is obtained when greater amounts of sugar are used.

Example 6

A heavy bodied filling that sets fast and gives improved results in any kind of water can be made adding part of the sugar separately and after the powdered mix has been whipped into the water:

| | Grams |
|---|---|
| Sodium alginate (calcium oxide content not greater than 1.0%) | 2.75 |
| Dicalcium phosphate | 0.40 |
| Sodium hexametaphosphate | 0.90 |
| Whipping agent | 2.50 |
| Citric acid (granular) | 1.50 |
| Sugar | 40.00 |
| Sodium chloride | 0.40 |
| | 48.45 |

Add 48.45 grams of the above dry blended powder to one cup of cold water while mixing in a one-quart mixing bowl with an electric mixer running at highest speed. After one minute, add an additional ⅓ cup of sugar and continue whipping until filling stands in peaks, the total whipping time being about 3 to 5 minutes.

It is understood that the examples are given by way of illustration only and are not to be considered as a limitation on the scope of the invention as defined in the appended claims.

What is claimed is:

1. A new and useful composition suitable for producing an acid-type chiffon pie filling with water having at least a moderate degree of hardness comprising: 1.5 to 6 parts by weight of a low calcium ash water-soluble alginate; 0.25 to 5 parts by weight of an edible acidic ingredient; and ½ to 4 parts by weight of a whipping agent.

2. A new and useful cold instant, acid-type chiffon pie filling composition for use in tap water having at least a moderate degree of hardness comprising the following ingredients in parts by weight:

| | |
|---|---|
| Sodium alginate (calcium oxide content not greater than 1.0%) | 2.5 |
| Whipping agent | 2.5 |
| Citric acid (granular) | 2.0 |

3. A new and useful cold instant, acid-type chiffon pie filling composition comprising the following ingredients in parts by weight:

| | |
|---|---|
| Sodium alginate (calcium oxide content not greater than 1.0%) | 2.50 |
| Whipping agent | 2.50 |
| Citric acid (granular) | 1.50 |
| Calcium citrate | 0.05 |

4. A new and useful composition suitable for producing an instant acid-type chiffon pie filling with water comprising: 1.5 to 6 parts by weight of a low calcium ash water-soluble alkali alginate; 0 to 1.5 parts of an edible calcium salt; 0.25 to 5 parts by weight of an edible acidic ingredient; and ½ to 4 parts by weight of a whipping agent.

5. The invention according to claim 4 including a sequestering agent selected from the group consisting of sodium hexametaphosphate, trisodium phosphate, disodium phosphate, tetrasodium pyrophosphate, sodium tripolyphosphate, tripotassium phosphate, tetrapotassium pyrophosphate and potassium tripolyphosphate.

6. A new and useful composition for producing a cold instant, acid-type chiffon pie filling comprising: 1.5 to 6 parts by weight of a water-soluble alkali alginate, said alginate not containing more than 1.0% of calcium oxide; 0 to 1.5 parts by weight of a salt selected from the group consisting of dicalcium phosphate, calcium acetate, calcium benzoate, calcium citrate, calcium lactate, calcium carbonate, calcium tartrate, calcium gluconate and tricalcium phosphate; 0 to 2.5 parts by weight of a sequestering agent selected from the group consisting of sodium hexametaphosphate, trisodium phosphate, disodium phosphate, tetrasodium pyrophosphate, sodium tripolyphosphate, tetrapotassium pyrophosphate, tripotassium phosphate and potassium tripolyphosphate; 0.25 to 5 parts by weight of an edible acidic ingredient selected from the group consisting of citric acid, tartaric acid, fumaric acid, glucono-delta-lactone and adipic acid; and 1 to 4 parts by weight of a whipping agent selected from the group consisting of egg whites, sodium caseinate and soybean protein.

7. A new and useful composition suitable for producing a cold instant, acid-type chiffon pie filling comprising: 2.3 to 2.75 parts by weight of sodium alginate, said alginate not containing more than 1.0% of calcium oxide; 0.30 to 0.50 parts by weight of dicalcium phosphate; 0.85 to 0.90 parts by weight of sodium hexametaphosphate; 2.3 to 2.50 parts by weight of soybean whipping agent; and 1.40 to 1.50 parts by weight of citric acid.

8. A new and useful composition suitable for producing a cold instant, acid-type chiffon pie filling comprising the following ingredients by weight percent:

| | |
|---|---|
| Sodium alginate (calcium oxide content not greater than 1.0%) | 2.30 |
| Dicalcium phosphate | 0.30 |
| Sodium hexametaphosphate | 0.85 |
| Whipping agent | 2.30 |
| Citric acid (granular) | 1.40 |
| Sodium chloride | 0.30 |
| Sugar | 92.55 |

9. A new and useful composition suitable for producing a cold instant, acid-type chiffon pie filling comprising the following ingredients by weight percent:

| | |
|---|---|
| Sodium alginate (calcium oxide content not greater than 1.0%) | 2.30 |
| Dicalcium phosphate | 0.50 |
| Sodium hexametaphosphate | 0.85 |
| Whipping agent | 2.30 |
| Citric acid (granular) | 1.40 |
| Sodium chloride | 0.30 |
| Sugar | 92.35 |

10. A new and useful cold instant, acid-type chiffon pie filling composition comprising the following ingredients by weight percent:

| | |
|---|---|
| Sodium alginate (calcium oxide content not greater than 1.0%) | 0.70 |
| Dicalcium phosphate | 0.09 |
| Sodium hexametaphosphate | 0.26 |
| Soybean whipping agent (Whitson's 100) | 0.70 |
| Citric acid (granular) | 0.43 |
| Sodium chloride | 0.10 |
| Sugar | 28.00 |
| Water | 69.72 |

11. A new and useful composition suitable for producing a cold instant, acid-type chiffon pie filling comprising the following ingredients in parts by weight:

| | |
|---|---|
| Sodium alginate (calcium oxide content not greater than 1.0%) | 2.75 |
| Dicalcium phosphate | 0.40 |
| Sodium hexametaphosphate | 0.90 |
| Whipping agent | 2.50 |
| Citric acid | 1.50 |

12. A method of producing an instant cold, acidic, aerated composition comprising: admixing 1.5 to 6 parts by weight of a water-soluble alkali alginate, said alginate not containing more than 1.0% of calcium oxide; 0 to 1.5 parts by weight of a salt selected from the group consisting of dicalcium phosphate, calcium acetate, calcium benzoate, calcium citrate, calcium lactate, calcium carbonate, calcium tartrate, calcium gluconate and tricalcium phosphate; 0.25 to 2.5 parts by weight of a sequestering agent selected from the group consisting of sodium hexametaphosphate, trisodium phosphate, disodium phosphate, tetrasodium pyrophosphate, sodium tripolyphosphate, tripotassium phosphate, tetrapotassium pyrophosphate and potassium tripolyphosphate; 0.25 to 5 parts by weight of an edible acidic ingredient selected from the group consisting of citric acid, tartaric acid, fumaric acid, glucono-delta-lactone and adipic acid; and ½ to 4 parts by weight of a whipping agent selected from the group consisting of egg albumen, sodium caseinate and soybean protein.

13. The invention according to claim 12 including the step of introducing said mixture into the desired quantity of cold water.

14. A method of producing an instant cold, acid-type chiffon pie filling comprising: admixing the following materials in the amounts set forth in parts by weight:

Sodium alginate (calcium oxide content not greater than 1.0%) _____ 2.5
Whipping agent_____ 2.5
Citric acid_____ 2.0

15. A method of producing an instant cold, acid-type chiffon pie filling comprising admixing approximately 47 grams of the following materials with tap water in the amounts set forth in parts by weight for each cup of tap water so employed:

Sodium alginate (calcium oxide content not greater than 1.0%) _____ 2.5
Whipping agent_____ 2.5
Citric acid_____ 2.0
Sugar _____ 40.0 whipping the mixture for approximately one minute; adding approximately ⅓ of a cup of additional sugar, and whipping until peaks are formed.

16. A method of producing an instant cold, acid-type chiffon pie filling comprising admixing approximately 46.55 grams of the following materials with soft water in the amounts set forth in parts by weight for each cup of soft water so employed:

Sodium alginate (calcium oxide content not greater than 1.0%) _____ 2.50
Whipping agent_____ 2.50
Citric acid_____ 1.50
Sugar _____ 40.00
Calcium citrate_____ 0.05 whipping the mixture for approximately one minute; adding approximately ⅓ of a cup of additional sugar; and whipping for about two to five minutes until peaks are formed.

17. A method of producing an instant cold, acid-type chiffon pie filling comprising admixing the following materials in the amounts set forth in parts by weight with the amount of water to obtain the desired gel:

Sodium alginate (calcium oxide content not greater than 1.0%) _____ 2.30
Dicalcium phosphate_____ 0.30
Sodium hexametaphosphate_____ 0.85
Whipping agent_____ 2.30
Citric acid_____ 1.40

18. A method of producing an instant cold, acid-type chiffon pie filling comprising admixing approximately four ounces of the following materials with water in the amounts set forth in parts by weight for each cup of water so employed:

Sodium alginate (calcium oxide content not greater than 1.0%) _____ 2.30
Dicalcium phosphate_____ 0.30
Sodium hexametaphosphate_____ 0.85
Whipping agent_____ 2.30
Citric acid_____ 1.40
Sodium chloride_____ 0.30
Sugar _____ 92.55

19. A method of producing an instant cold, acid-type chiffon pie filling comprising admixing the following materials in the amounts set forth in parts by weight with the amount of water to obtain the desired gel:

Sodium alginate (calcium oxide content not greater than 1.0%) _____ 2.30
Dicalcium phosphate_____ 0.50
Sodium hexametaphosphate_____ 0.85
Whipping agent_____ 2.30
Citric acid_____ 1.40

20. A method of producing an instant cold, acid-type chiffon pie filling comprising admixing approximately four ounces of the following materials with water in the amounts set forth in parts by weight for each cup of water so employed:

Sodium alginate (calcium oxide content not greater than 1.0%) _____ 2.30
Dicalcium phosphate_____ 0.50
Sodium hexametaphosphate_____ 0.85
Whipping agent_____ 2.30
Citric acid_____ 1.40
Sodium chloride_____ 0.30
Sugar _____ 92.35

21. A method of producing an instant cold, acid-type chiffon pie filling comprising admixing the following materials in the amounts set forth by weight percent:

Sodium alginate (calcium oxide content not greater than 1.0%) _____ 0.70
Dicalcium phosphate_____ 0.09
Sodium hexametaphosphate_____ 0.26
Soybean whipping agent_____ 0.70
Citric acid_____ 0.43
Sodium chloride_____ 0.10
Sugar _____ 28.00
Water _____ 69.72

22. A method of producing an instant cold, acid-type chiffon pie filling comprising admixing approximately 48.45 grams of the following materials with water in the amounts set forth in parts by weight for each cup of water so employed:

Sodium alginate (calcium oxide content not greater than 1.0%) _____ 2.75
Dicalcium phosphate_____ 0.40
Sodium hexametaphosphate_____ 0.90
Whipping agent_____ 2.50
Citric acid_____ 1.50
Sugar _____ 40.00
Sodium chloride_____ 0.40 whipping the mixture for approximately one minute; adding approximately ⅓ of a cup of additional sugar, and whipping for from two to five minutes until peaks are formed.

23. A method of producing an instant cold, acid-type chiffon pie filling comprising: admixing 2.75 parts by weight of sodium alginate, said alginate not containing more than 1.0% of calcium oxide; 0.30 to 0.50 parts by weight of dicalcium phosphate; 0.85 to 0.90 parts by weight by sodium hexametaphosphate; 2.30 to 2.50 parts by weight of soybean whipping agent; and 1.40 to 1.50 parts by weight of citric acid.

24. A new and useful composition suitable for producing an instant acid-type chiffon pie filling with water comprising 1.5 to 6 parts by weight of a low calcium ash water-soluble alkali alginate; an edible calcium salt in an amount sufficient to form a calcium alginate gel in said water; 0.25 to 5 parts by weight of adipic acid; and ½ to 4 parts by weight of a whipping agent.

References Cited in the file of this patent

UNITED STATES PATENTS 2,441,729    Steiner _____ May 18, 1948
2,588,419    Sevall et al. _____ Mar. 11, 1952